(12) United States Patent
Cunningham

(10) Patent No.: US 9,091,835 B2
(45) Date of Patent: Jul. 28, 2015

(54) FIBER OPTIC ASSEMBLY WITH LOOPBACK

(71) Applicant: CORNING CABLE SYSTEMS LLC, Hickory, NC (US)

(72) Inventor: Dave Eric Cunningham, Conover, NC (US)

(73) Assignee: Corning Cable Systems LLC, Hickory, NC (US)

( * ) Notice: Subject to any disclaimer, the term of this patent is extended or adjusted under 35 U.S.C. 154(b) by 143 days.

(21) Appl. No.: 13/799,141

(22) Filed: Mar. 13, 2013

(65) Prior Publication Data

US 2014/0161402 A1    Jun. 12, 2014

Related U.S. Application Data

(60) Provisional application No. 61/734,071, filed on Dec. 6, 2012.

(51) Int. Cl.
| | | |
|---|---|---|
| *G02B 6/24* | (2006.01) | |
| *G02B 6/44* | (2006.01) | |
| *G02B 6/26* | (2006.01) | |
| *H04B 10/85* | (2013.01) | |

(52) U.S. Cl.
CPC .............. *G02B 6/4471* (2013.01); *G02B 6/264* (2013.01); *H04B 10/85* (2013.01)

(58) Field of Classification Search
CPC ......... G02B 6/4471; G02B 6/24; G02B 6/264
USPC .......................... 385/32, 76, 77, 100, 135, 139
See application file for complete search history.

(56) References Cited

U.S. PATENT DOCUMENTS

| | | | | |
|---|---|---|---|---|
| 3,912,854 | A * | 10/1975 | Thompson et al. | 174/88 C |
| 5,093,886 | A | 3/1992 | Smoker et al. | 385/135 |
| 5,367,159 | A | 11/1994 | Schofield et al. | 250/227.11 |
| 6,612,753 | B1 | 9/2003 | Cryan et al. | 385/96 |
| 6,621,975 | B2 * | 9/2003 | Laporte et al. | 385/135 |
| 6,654,523 | B1 * | 11/2003 | Cole | 385/52 |
| 7,016,592 | B2 * | 3/2006 | Elkins et al. | 385/136 |
| 7,277,614 | B2 * | 10/2007 | Cody et al. | 385/100 |
| 8,208,779 | B2 * | 6/2012 | Bonicel | 385/135 |
| 8,511,911 | B2 * | 8/2013 | Ott et al. | 385/78 |
| 8,630,523 | B2 * | 1/2014 | Smith et al. | 385/136 |
| 2003/0063862 | A1 | 4/2003 | Fillion et al. | 385/53 |
| 2005/0053341 | A1 | 3/2005 | Zimmel | 385/111 |
| 2005/0111800 | A1 * | 5/2005 | Cooke et al. | 385/100 |

(Continued)

FOREIGN PATENT DOCUMENTS

CN    202177957 U    3/2012    ........... G08B 13/186

OTHER PUBLICATIONS

Patent Cooperation Treaty, International Search Report and Written Opinion for International Application No. PCT/US2013/072713; Mailing Date Feb. 21, 2014—10 pages.

*Primary Examiner* — Daniel Petkovsek

(57) ABSTRACT

A fiber optic assembly includes an optical cable supporting a plurality of optical fibers and a furcation integrated with the optical cable. The furcation separates optical fibers of the plurality into a first set and a second set. The first set includes a loopback channel that enters the furcation, loops around within the furcation, and then returns to the optical cable such that optical transmissions passing along the loopback channel pass twice through the optical cable in opposing directions. The second set passes through the furcation without looping back into the optical cable.

15 Claims, 1 Drawing Sheet

(56) References Cited

U.S. PATENT DOCUMENTS

2010/0150504 A1 6/2010 Allen et al. .................... 385/76
2012/0027361 A1* 2/2012 Brower et al. ................. 385/89

* cited by examiner

FIBER OPTIC ASSEMBLY WITH LOOPBACK

RELATED APPLICATIONS

This application claims the benefit of priority under 35 U.S.C. §119 of U.S. Provisional Application Ser. No. 61/734,071 filed on Dec. 6, 2012 the content of which is relied upon and incorporated herein by reference in its entirety.

BACKGROUND

Aspects of the present disclosure relate generally to systems and networks of optical cables, which may include optical fibers to transmit and receive signals. More specifically, some aspects of the present disclosure relate to optical cable systems that include integrated signal loopback features.

Network deployments for governments or other entities, such as components of the US Federal Government, may require high security. Protected Distribution Systems (PDS) networks have strict requirements for cable protection and wiretapping prevention. For example, some such systems have sealed, exposed conduits that can be visually inspected for tampering. However, such systems tend to be very expensive as well as unsightly in office environments.

Other intrusion monitoring systems have been developed that monitor an optical cable for movement or tampering by monitoring changes in light patterns of signals communicated via the optical cable. Such intrusion monitoring systems typically rely upon loopback devices or assemblies that return a signal from the source (i.e., loop the signal back). Distortions or changes in return signals may indicate intrusion. Such intrusion monitoring systems employing loopback devices or assemblies may eliminate a need for exposed, hardened conduits.

However, connection schemes that employ the loopback intrusion monitoring systems may be bulky and complex, often requiring mechanical connections of loopback channels on ends of cables. For example, loopbacks may be formed by attaching connectors to two fibers on the end of a cable, using adapters and a bridge fiber with two more connectors to connect the two fibers of the cable. The connections result in attenuation losses in the loopback signals as well as provide a source for assembly error, particularly in complex networks.

A need exists for a secure intrusion monitoring system that can be efficiently deployed in an office or data center environment, that takes up little space, and/or that allows for easy assembly in complex networks while limiting the ability of potential intruders to tap the network.

SUMMARY

Technology disclosed herein aids in use of intrusion monitoring systems in optical networks, such as passive optical networks, where loopbacks are used to allow an intrusion prevention system to monitor devices connected through a splitter.

One embodiment relates to a fiber optic assembly. The fiber optic assembly includes an optical cable supporting a plurality of optical fibers and a furcation integrated with the optical cable. The furcation separates optical fibers of the plurality into a first set and a second set. The first set includes a loopback channel that enters the furcation, loops around within the furcation, and then returns to the optical cable such that optical transmissions passing along the loopback channel pass twice through the optical cable in opposing directions. The second set passes through the furcation without looping back into the optical cable.

Another embodiment relates to a fiber optic furcation assembly for use on an end of an optical cable. The assembly includes a housing as well as first and second sets of optical waveguides, such as optical fibers or other bounded pathways for light, supported by the housing. The first set includes a loopback channel for optical transmissions to enter the housing, loop around within the housing, and then exit the housing such that optical transmissions passing along the loopback channel pass through the housing in a first direction and then in a second direction that opposes the first direction. Optical transmissions passing along the second set pass through the housing without looping back within the housing.

Yet another embodiment relates to a secure optical network, which includes a main optical cable, branch optical cables, and furcations on ends of the branch optical cables. The main optical cable supports a plurality of optical fibers including first and second sets of one or more of the optical fibers. Each branch optical cable includes a first optical fiber optically coupled to the first set and a second optical fiber optically coupled to the second set. The furcations each support a loopback channel that enters the furcation, loops around within the furcation, and then returns to the respective branch optical cable. The first optical fiber of each branch optical cable is optically coupled to the loopback channel of the respective furcation. The second optical fiber of each branch optical cable passes through the respective furcation without looping back into the branch optical cable. Furthermore, the first set, the first optical fiber of each branch optical cable, and the loopback channels of the furcations are optically connected to one another to form an optical loop. The optical loop is such that test signals provided on a distal end of the main optical cable may pass through the first set, back and forth through each of the branch optical cables in succession with one another, at least by way of the first optical fiber of the respective branch optical cables and facilitated by the loopback channels of each corresponding furcation, and then back through the main optical cable. Accordingly, the optical loop is such that changes in communication of the test signals between transmission and receipt, on the distal end of the main optical cable, may be used to detect tampering in the optical network.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present inventive and innovative technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Technology disclosed herein includes a loopback (or loopbacks) integrated with a branch optical cable in a secure network, such as inside a furcation at a user-end of the branch optical cable (e.g., end connecting to an optical line terminal), eliminating a need for connectors and/or adapters to create the loopback at the user-end of a branch optical cable. This technology may result in improved system performance, greater security, less-expensive deployment costs, and faster installation and troubleshooting.

Figure 1:
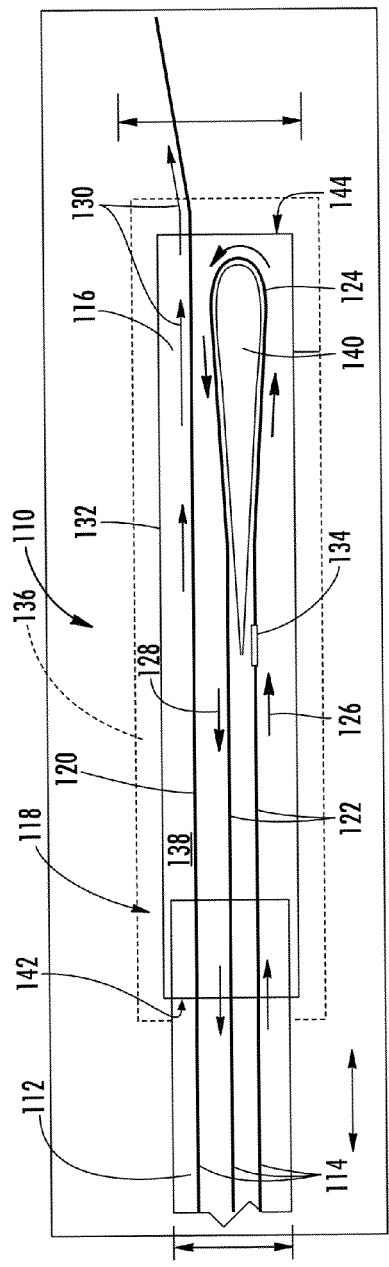
FIG. 1 is a schematic diagram of a fiber optic assembly including an optical cable and a furcation having a loopback channel according to an exemplary embodiment.

Referring to FIG. 1, a fiber optic assembly 110 includes an optical cable 112, supporting a plurality of optical fibers 114, and a furcation 116 (e.g., furcation assembly) integrated with the optical cable 112, such as integrally attached to an end 118 thereof. The furcation 116 separates optical fibers of the plurality 114 into a first set 122 of one or more of the optical fibers and a second set 120. The first set 122 includes a loopback channel 124 (e.g., pathway) that enters the furcation 116, loops around within the furcation 116, and then returns to the optical cable 112 such that optical transmissions passing along the loopback channel 124 pass through the optical cable in opposing directions (see, e.g., arrows 126, 128). Transmissions along the second set 120 pass through the furcation 116 without looping back into the optical cable 112 (see, e.g., arrows 130).

According to an exemplary embodiment, the furcation 116 includes a housing 132 having a splice 134 therein along the loopback channel 124 of the first set 122. The splice 134 may include a fusion splice between two optical fibers, such that cores of the optical fibers have been aligned and the optical fibers have been at least partially fused together. Alternatively, the splice may include a mechanical splice, where two optical fibers are aligned with one another and mechanically coupled, such as by holding the optical fibers in place and in communication with one another. In still other contemplated embodiments, the optical fibers may be otherwise spliced together.

Use of a splice, instead of optical connectors attached to the end of the branch optical cable to form the loopback, is believed to reduce attenuation of the loopback channel. For example, use of connectors to form a loopback may result in about 0.5 dB of attenuation per loopback. For a network containing thirty-two branch optical cables, sixty-three loopbacks may be needed to form an overall optical loop connecting all branches. Accordingly, the net attenuation may require a high-powered laser to provide a signal strong enough to pass through the full loop to detect tampering in the system. Use of a splice in furcations may reduce the associated attenuation by a factor of ten per loopback compared to optical connectors, such as having an attenuation per fiber in the furcation of less than 0.1 dB, such as between about 0.1 dB and about 0.05 dB (or less) at a wavelength of 1310 nanometers (nm) and/or at a wavelength of 1490 nm. In other contemplated embodiments, some or all loopbacks of a secure network, as disclosed herein, may include or use one or more connectors.

In other embodiments, the loopback channel 124 is formed from an unspliced optical fiber 112 that extends from the optical cable 112, loops around within the furcation 116 and then passes back into the optical cable 112. For example, the fiber may be blown or pushed through a conduit (e.g., tube or cavity) in the branch optical cable 112, looped around within the furcation, and blown or pushed in reverse back through the same or a different conduit of the branch optical cable 112. Attenuation for such loopbacks may be nominal, particularly if the radius of the bend within the furcation is controlled to a magnitude that is compatible with the optical fiber, such as a bend radius of at least 5 mm for bend-insensitive fibers (e.g., CORNING® CLEARCURVE® ZBL optical fiber sold by Corning Incorporated of Corning, N.Y.).

According to an exemplary embodiment, the housing 132 of the furcation 116 is permanently bonded directly to the end 118 of the optical cable 112, whereby the furcation 116 is integrated with the optical cable 112. For example, in some embodiments the furcation 116 is an extension of the optical cable 112 and cannot be easily unplugged or unscrewed. In some embodiments, the permanent bond between the furcation 116 and the end 118 of the optical cable 112 is facilitated by a features 136, such as an overmold or a heat shrink surrounding the furcation 116 and bonded to the optical cable 112. The permanence of the housing 132 and bonding of the housing 132 to the cable 112 with the integrated loopback 124 is intended to be difficult to remove or tamper with for potential intrusions into an associated secure network (see generally FIG. 2).

In some embodiments, the housing 116 comprises a polymeric potting material 138, such as an epoxy or a thermoplastic, permanently encasing contents therein, which may include the splice 134. The potting material 138 provides an additional security measure to the loopback 124 by providing an impermeable barrier even if an intruder is able to remove the exterior feature 136. For example, attempted tapping into the loopback through the potting material may irreparably damage the loopback, facilitating detection of the intrusion.

According to an exemplary embodiment, the housing 116 of the furcation has a low profile such that the average cross-sectional dimension $W_F$ of the housing 116 orthogonal to the length L of the optical cable 112 is less than twice the average cross-sectional dimension $W_C$ of the optical cable 112. In some embodiments, the average cross-sectional dimension $W_F$ of the housing 116 orthogonal to the length L of the optical cable 112 is less than 1.25 times the average cross-sectional dimension of the optical cable $W_C$.

Accordingly, integration of the loopback 124 into the furcation 116 attached to the end of the optical cable 112 may improve the efficiency when deploying the assembly 110 relative to other assemblies in at least two key respects. First, no assembly of the integrated loopback 124 is necessary during deployment of the assembly 110, saving time and possibly preventing sources of error for an associated secure network (see generally FIG. 2). Second, the low-profile of the furcation 116 may allow deployment of the assembly 110 through narrow ducts and passageways while in a fully- or at least partially-assembled state.

In contemplated embodiments, the furcation 116 may be an assembly configured for use on an end 118 of an optical cable 112, but not necessarily integrated therewith. For example, in at least some contemplated embodiment, the furcation 116 may be a separable element configured to attach or couple with the optical cable or a connector attached thereto. In other embodiments the furcation 116 uses the jacket of the cable for a housing such that the loopback is formed within the cable, without a separate assembly attached to the cable.

However, in some preferred embodiment, the furcation 116 includes a housing 132, as shown in FIG. 1, a first set of optical waveguides supported by the housing 132 and a second set of optical waveguides supported by the housing 132. The optical waveguides may be in the form of the plurality of optical fibers 114, or the waveguides may include other forms of elements that bound and control the direction of light transmissions (e.g., arrays of lenses and reflectors). Optical fibers of the plurality 114 may include single mode fibers, multi-mode fibers, multi-core fibers, tight-buffered fibers, bend-insensitive fibers, glass core/cladding optical fibers, plastic core/cladding optical fibers, and/or different types or combinations of optical fibers.

In some embodiments, the furcation may be integrated with or coupled to a connector on the end 118 of the optical cable 112. For example, the optical cable 112 may be "plant terminated," meaning that the connector is attached during factory manufacturing of the assembly (as opposed to field terminated), which is then sold as an assembled product. The first and/or the second sets of optical fibers of the plurality 114 may include one or more optical fibers per set, such as multiple fibers in first set 122 for redundant loopbacks or multiple fibers in the second set 120 coupled to one or more connectors (e.g., a multi-fiber connector) on the second side 144 of the furcation 116.

According to an exemplary embodiment, the furcation 116 further includes a radius control device 140 within the housing 132. Bending of an optical fiber of the first set 122 within the housing 132, while looping around within the furcation 116, is limited by the radius control device 140. For example, the radius control device 140 may include a rounded surface having a constant or substantially constant radius over which the optical fiber of the first set 122 is wound. In some embodiments, the radius is less than 10 mm, such as less than 7 mm, such as about 5 mm or less, such that the furcation 116 may have a low profile as discussed above.

According to an exemplary embodiment, transmissions passing along the loopback channel 124 both enter and exit the housing 132 on a first side 142 of the housing 132. In some such embodiments, transmissions passing along the second set 120 enter the housing on the first side and exit the housing on a second side 144. In some embodiments, as discussed above, the loopback channel 124 of the first set 122 loops around within the housing 132 without use of fiber optic connectors or adapters within or outside of the housing 132.

Figure 2:
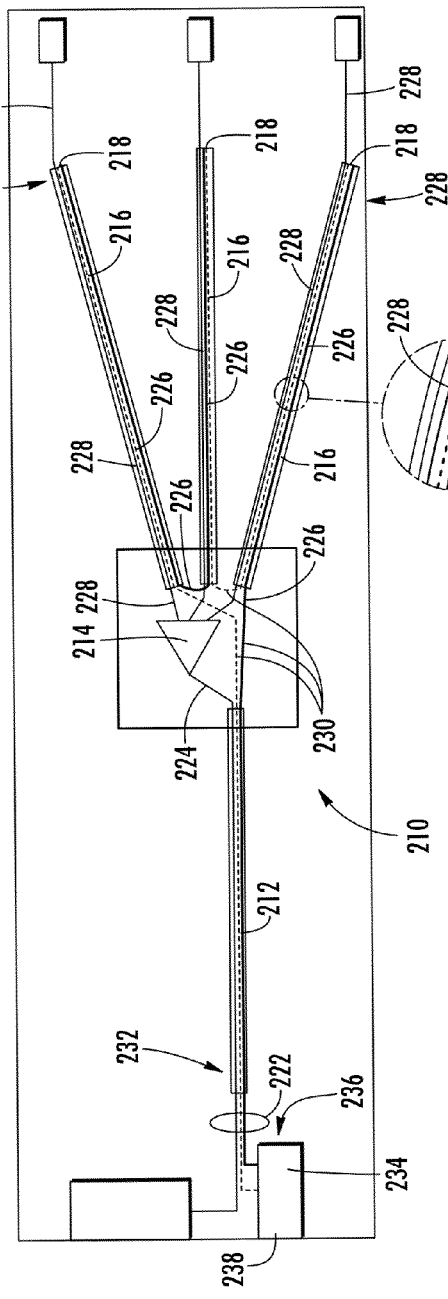
FIG. 2 is a schematic diagram of a secure optical network including an optical loop for monitoring for intrusions into the network according to an exemplary embodiment.

The fiber optic assembly 110, or a similar such assembly, may be used with a secure optical network. Referring now to FIG. 2, a secure optical network 210 may include a main optical cable 212, an optical splitter 214, branch optical cables 216 and furcations 218 on ends 220 of the branch optical cables 216. The main optical cable supports a plurality of optical fibers 222 including first and second sets of one or more of the optical fibers 224 (see, e.g., first and second sets 120, 122 as shown in FIG. 1).

According to an exemplary embodiment, the optical splitter 214 is coupled to at least one optical fiber 224 of the second set such that the optical splitter 214 is configured to split optical transmissions transmitted via the second set. Each branch optical cable 216 includes a first optical fiber 226 optically coupled to the first set and a second optical fiber 228 optically coupled to the second set by way of the optical splitter 214. In other contemplated embodiments, the network does not include a splitter, and the second set of optical fibers from the plurality 222 in the main cable 212 includes one or more distinct optical fibers for each branch optical cable 216.

According to an exemplary embodiment, the furcations 218 each support a loopback channel (see loopback channel 124 as shown in FIG. 1) that enters the furcation 218, loops around within the furcation 218, and then returns to the respective branch optical cable 216 such that optical transmissions passing along the loopback channel pass twice through the branch optical cable 216 in opposing directions (e.g., generally opposite directions; directions having at least one opposite vector directional component when viewed in a plan along the length of the respective branch optical cable (as shown in FIGS. 1-2)).

According to an exemplary embodiment, the first optical fiber 226 of each branch optical cable 216 is optically coupled to (e.g., spliced with, continuous with) the loopback channel of the respective furcation 218. According to some such embodiments, the second optical fiber 228 of each branch optical cable 216 passes through the respective furcation 218 without looping back into the branch optical cable 216.

According to an exemplary embodiment, the first set from the main optical cable 212, the first optical fiber 226 of each branch optical cable 216, and the loopback channels of the furcations 218 are optically connected to one another to form an optical loop 230. The optical loop 230 is such that test signals provided on a distal end 232 of the main optical cable 212 may pass through the first set from the main optical cable 212, back and forth through each of the branch optical cables 216 in succession with one another, at least by way of the first optical fiber 226 of the respective branch optical cables 216 and facilitated by the loopback channels of each corresponding furcation 218, and then back through the main optical cable 212.

Accordingly, the optical loop 230 is such that changes in communication of the test signals between transmission and receipt, on the distal end 232 of the main optical cable, may be used to detect tampering in the optical network. In some embodiments, the network includes two or more loops 230 that are redundant to one another and/or are placed in different areas of the respective branch optical cables 216, such as in different buffer tubes of twelve fibers, with at least one loop per buffer tube.

An intrusion monitor 234 may be coupled to the optical loop 230, which includes a laser 236 or other source and an optical sensor 238. The laser 236 provides the test signal, and the sensor receives the signal. If the signal is repeated, the sensor can detect tampering in the network by changes in the signal, such as increased attenuation. The sensor may then indicate an alert or a signal to lock or shut down the network.

Advantages of an optical cable 112 including a permanent integrated loopback 124, such as with the furcation 116 shown in FIG. 1, include: (1) that the loopback cannot be easily disconnected by the user or an intruder, adding to the security of the system; (2) the integration removes a need for four connectors and two adapters per loopback from the user-end (e.g., optical network terminals, as shown in FIG. 2), reducing system-wide attenuation losses and material costs (e.g., a lower-powered laser may be used with the intrusion monitor 234); (3) the integrated loopback and furcation simplifies system installation, removing the potential for patching errors at the user-end of the system; and (4) the integrated loopbacks, as disclosed herein, reduce space requirements for the assembly at the user-end by eliminating two mated pairs of connectors.

The construction and arrangements of the optical assemblies, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A fiber optic assembly, comprising:
   an optical cable supporting a plurality of optical fibers;
   a furcation integrated with the optical cable, wherein the furcation separates optical fibers of the plurality of optical fibers into a first set of optical fibers and a second set of optical fibers; and
   wherein the first set of optical fibers includes a loopback channel that enters the furcation from the optical cable, loops around within the furcation, and then returns to the optical cable such that optical transmissions passing along the loopback channel pass twice through the optical cable in opposing directions,
   wherein the second set of optical fibers passes through the furcation without looping back into the optical cable,
   wherein the furcation includes a housing that comprises a polymeric potting material permanently encasing the first and second sets of optical fibers.

2. The assembly of claim 1, further comprising a splice along the loopback channel of the first set of optical fibers, wherein the splice is permanently encased by the polymeric potting material of the housing.

3. The assembly of claim 2, wherein the housing of the furcation is permanently bonded directly to an end of the optical cable, whereby the furcation is integrated with the optical cable.

4. The assembly of claim 3, wherein the permanent bond is facilitated by at least one of:
   an overmold surrounding the furcation and bonded to the optical cable; and
   a heat shrink surrounding the furcation and bonded to the optical cable.

5. The assembly of claim 3, wherein the housing of the furcation has a low profile such that the average cross-sectional dimension of the housing orthogonal to the length of the optical cable is less than twice the average cross-sectional dimension of the optical cable.

6. The assembly of claim 5, wherein the average cross-sectional dimension of the housing orthogonal to the length of the optical cable is less than 1.25 times the average cross-sectional dimension of the optical cable.

7. The assembly of claim 1, the fiber optic assembly further comprising a radius control device within the housing, wherein bending of an optical fiber of the first set of optical fibers within the housing while looping around is limited by the radius control device.

8. The assembly of claim 1, wherein transmissions passing along the loopback channel both enter and exit the housing on a first side of the housing.

9. The assembly of claim 8, wherein transmissions passing along the second set of optical fibers enter the housing on the first side and exit the housing on a second side.

10. The assembly of claim 1, wherein the loopback channel of the first set of optical fibers loops around within the housing without use of fiber optic connectors or adapters, and wherein the second set of optical fibers includes more than one optical fiber.

11. A fiber optic assembly, comprising:
    an optical cable supporting a plurality of optical fibers; and
    a furcation integrated with the optical cable, wherein the furcation separates the plurality of optical fibers into at least a first optical fiber and a second optical fiber;
    wherein the furcation includes a housing that comprises a polymeric potting material permanently encasing the first and second optical fibers;
    wherein the first optical fiber forms at least part of a loopback channel that enters the furcation from the optical cable, loops around within the furcation, and then returns to the optical cable such that optical transmissions passing along the loopback channel pass twice through the optical cable in opposing directions; and
    wherein the second optical fiber is arranged such that optical transmissions passing along the second optical fiber through the housing without looping back within the housing.

12. The assembly of claim 11, wherein transmissions passing along the loopback channel both enter and exit the housing on a first side of the housing.

13. The assembly of claim 12, wherein transmissions passing along the second optical fiber enter the housing on the first side and exit the housing on a second side.

14. The assembly of claim 11, wherein the first optical fiber comprises an unspliced optical fiber that forms the loopback channel.

15. The assembly of claim 11, wherein the loopback channel includes a splice within the housing between the first optical fiber and another optical fiber.

* * * * *